United States Patent Office 3,541,290
Patented Nov. 17, 1970

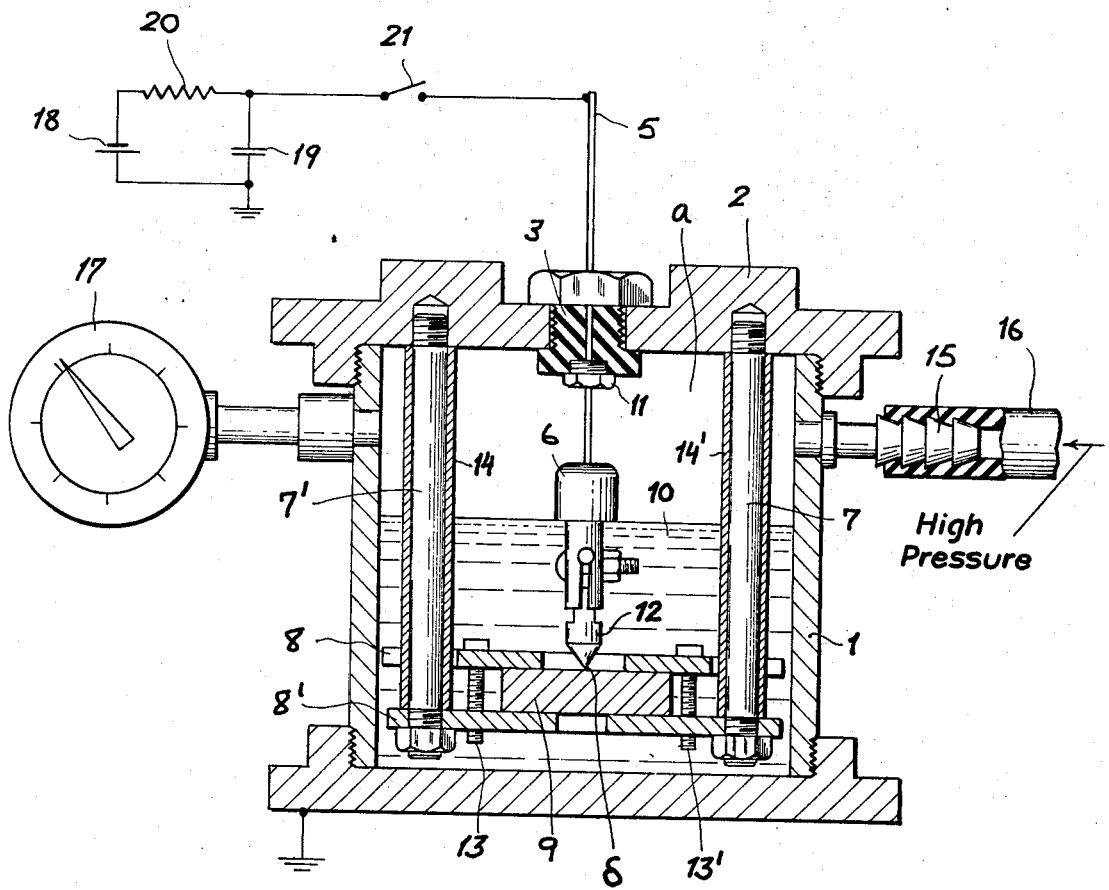

3,541,290
PROCESS AND DEVICE FOR THE ELECTRO-EROSIVE MACHINERY OF WORKPIECES UNDER A PRESSURIZED DIELECTRIC
Ilie Isarie, Timisoara, Rumania, assignor to Institutul Politehnic Timisoara, Timisoara, Rumania, an institute of Rumania
Filed Jan. 22, 1968, Ser. No. 699,694
Claims priority, application Rumania, Jan. 21, 1967, 52,934
Int. Cl. B23p 1/08
U.S. Cl. 219—69                 6 Claims

ABSTRACT OF THE DISCLOSURE

A metallic workpiece is machined by spark discharge in a dielectric or semidielectric liquid overlain by a gas cushion which maintains the liquid under a pressure of several atmospheres, preferably substantially greater than the magnetic pressure exerted upon the plasma column.

---

My present invention relates to a process and a device for machining metallic workpieces by the spark-discharge technique, also known as electro-erosion. This technique has been described, for example, in U.S. Pat. Nos. 3,014,-155, 3,035,151, 3,056,014, 3,087,044, 3,098,149 and 3,-138,691.

As described in these prior patents, a workpiece to be machined is immersed in a dielectric or semidielectric liquid (e.g. kerosene) whereupon a cathodically connected electrode is brought into proximity with the workpiece surface for the iterative discharge of a spark across the intervening gap, usually from a condenser connected across a source of direct current. The liquid may be agitated, e.g. by forced circulation through an external reservoir, in order to help sweep away the dislodged particles from the erosion zone.

The general object of my present invention is to provide an improved technique for the electro-erosion of workpieces in the aforedescribed manner with increased efficiency, reduced roughness of the erode surface and greater service life of the electrode employed.

I have found, in accordance with the present invention, that these advantages may be realized—under otherwise equal operating conditions—by subjecting the dielectric or semidielectric working liquid to a static pressure of at least several atmospheres during the discharge. Advantageously, this static pressure should be large in comparison with the magnetic pressure exerted upon the plasma column in the discharge gap.

In accordance with a more specific feature of my invention, the static pressure referred to is produced with the aid of a cushion of air of inert gas bearing upon the liquid pool and preferably overlying same within a sealed working chamber. The gas cushion may be continuously or intermittently connected to a compressor or to a pressure accumulator in order to maintain the desired pressure level within the chamber.

The invention will be described in greater detail with reference to the accompanying drawing whose sole FIG. illustrates in axial section, and partly diagrammatically, a device for the electro-erosion of a workpiece in accordance with the present improvement.

The device shown in the drawing comprises a fluid-tight chamber 1 sealed by a lid 2 which is centrally provided with an insulating insert 3 fixed in position by a nut 4. A conductive rod 5 traverses the bushing 3 and is maintained in airtight contact therewith by a clamping nut 11. Rod 5 terminates within chamber 1 in chuck 6 supporting an electrode 12 whose point passes through a hole in a mounting plate 8 toward the surface of a workpiece 9 resting upon a supporting plate 8'; plate 8' to which plate 8 is secured by screws 13, 13', is suspended from lid 2 by a pair of bolts 7, 7' surrounded by spacing tubes 14, 14'. Workpiece 9 and electrode 12 are immersed in a pool of nonaqueous liquid 10 of the type conventionally used in spark-discharge machining. A nipple 15 connects an air space $a$ above liquid 10 through a conduit 15 to a source of high-pressure gas not shown; the pressure of the air or gas cushion $a$ can be read on a manometer 17.

The spacing between the tip of electrode 12 and the surface of workpiece 9, which may be a block of austenitic manganese steel containing a small proportion of tungsten carbide and alloyed with cobalt in a proportion of 5 to 50%, has been designated $\delta$ and may be on the order of 0.01 mm.

A spark-discharge generator has been illustrated diagrammatically as including a source of direct current 18 connected across a condenser 19 through a charging resistor 20, the negative terminal of condenser 19 being connectable through a switch 21 to conductor 5 of electrode 12.

As will be shown in detail hereinafter, a discharge current on the order of several amperes generates at the gap $\delta$ a magnetic pressure $p_H$ of about 2 to 3 atmospheres. The static pressure $p$ maintained inside chamber 1 by the gas cushion $a$ should, for best results, be several times this magnetic pressure $p_H$.

The aforedescribed advantages of a system according to my invention can be explained on the basis of magnetohydrodynamic theory as applied to the plasma column generated in the spark gap between the electrode 12 and the workpiece 9. This plasma column is surrounded by an annular magnetic field generating a magnetic pressure $p_H$ which satisfies the condition of magnetohydrostatic equilibrium.

$$\operatorname{grad} p = \vec{j} \times \vec{B} \tag{1}$$

wherein $\vec{j}$ is the density of the plasma current and $\vec{B}$ is the magnetic induction. The plasma-current density is given by Maxwell's equation $$\vec{j} = \operatorname{curl} \vec{H} \tag{2}$$

which, since $$\vec{B} = \mu \vec{H} \tag{3}$$

and upon integration, yields an expression for the magnetic pressure as follows:

$$p_H = \frac{\mu}{2} H^2 \tag{4}$$

The magnetic-field strength H at the periphery of the plasma column is given by $$H = \frac{I}{2\pi r} \tag{5}$$

where I is the magnitude of the column current and $r$ is the radius of the column.

Upon substituting practical values of $r = 10^{-4}$ cm. and $I = 4$ amps in the foregoing equations, we find that the magnetic pressure is approximately equal to 2.5 atmospheres.

As the radius $r$ of the column represents also the radius of the craters or pits formed on the eroded surface of the anodic workpiece, it follows that this radius is on the order of microns as long as the aforedescribed magnetic pressure is supplemented only by atmosperic pressure $p_0$ acting upon the working liquid.

The plasma inside the column behaves virtually as a perfect gas. We can thus consider a gas column of volume $V = r^2 \pi \delta$ which satisfies Boyle's law $$V(p_H + p) = \frac{m}{M} RT \qquad (6)$$

wherein $m$ is the mass of the gas and M represents the molecular weight. Thus, as long as p is substantially smaller than $p_H$, the ambient pressure exerted upon the liquid has little influence on the crater size. With increasing values of the ratio $p/p_H$, however, the effect of $p$ upon the radius $r$ becomes more dominant and results in reduced values of $r$ with a commensurately smoother workpiece surface.

For a more detailed analysis of this relationship we may consider the quantity $m$ of matter in the plasma column as proportional to the energy released in a single discharge, this energy in turn being determined by the capacity of the spark-generator condenser 19 whence, with the condenser charged to a voltage U, $$m \propto E \propto \frac{CU^2}{2} \qquad (7)$$

We can also assume that the released energy is proportional to the heat developed in the plasma column so that $$E \propto mT \qquad (8)$$

From Equations 6, 7 and 8 we can derive the expression $$V = r^2 \pi \delta = \frac{\beta CU^2}{p + \frac{\mu I_4}{4\pi^2 r^2}} \qquad (9)$$

where $\beta$ is a proportionality factor. Solving for $r$ we obtain $$r = \sqrt{\frac{\beta CU^2 - \mu \delta I^2/8\pi}{p\delta\pi}} \qquad (10)$$

which shows that the radius $r$ varies inversely with the square root of the ambient pressure $p$.

The unstable plasma column breaks down after a short period of time. The mechanism of breakdown involves a localized narrowing or strangulation of the column with resulting reduction of radius $r$ and increase of the magnetic pressure $p_H$ in that zone; this phenomenon further magnifies the deformation and finally destroys the plasma column.

Using the magnetohydrodynamic equations for weak disturbances, we can write:

$$\rho \frac{\partial \vec{u}}{\partial t} + \text{grad } p' + [\vec{b} \text{ curl } \vec{H}] + [\vec{B} \text{ curl } \vec{h}] = 0 \qquad (11)$$

and $$\frac{\partial \vec{b}}{\partial t} - \text{curl } [\vec{u}\vec{B}] = 0 \qquad (12)$$

where $u$ is the propagation speed of the disturbance, $\rho$ is the plasma density, $p'$ is the pressure variation, and $\vec{b}$ and $\vec{h}$ are the variations of $\vec{B}$ and $\vec{H}$, respectively.

The foregoing equations yield an aperiodic solution of the form $$\vec{u} = u_0 e^{\gamma t} \qquad (13)$$

$$\vec{u} = u_0 e^{\gamma t} \qquad (13)$$

wherein $\gamma$ has the value $$\tau = \sqrt{\frac{2p_H}{\rho_0 r}} K \qquad (14)$$

and K is the factor determined by the mode of wave propagation (number of nodal points), $\rho_0$ being the plasma density at atmospheric pressure.

The coefficient $\gamma$ characterizes the rate of expansion of the disturbance and is reciprocal of the time constant $\tau$ for the development of instability, whence $$\tau = \frac{1}{\gamma} = \sqrt{\frac{\rho_0 r}{2p_H K}} \qquad (15)$$

The time contant $\tau$ varies inversely with the square root of K whose upper and lower limits are given by the inequality $$\frac{\pi}{\delta} \leq K \leq \infty \qquad (16)$$

This time constant assumes its largest value for the lower limit of K, i.e.

$$\tau_{max.} = \sqrt{\frac{\rho_0 r \delta}{2\pi p_H}} \qquad (17)$$

Upon again substituting practical values in the foregoing expressions, i.e. $\rho_0 = 1$ kg./m.$^2$, $\gamma = 10^{-4}$ cm., $\delta = 10^{-3}$ cm. and $p_H = 2.5$ atm., we obtain a value for $\tau_{max}$ up to about $10^{-8}$ second. Experimentally, the time required for the initiation of the discharge has been measured at less than $3 \cdot 10^{-8}$ second.

The constant $\tau$ is also a measure of the time interval during which high-frequency magnetoacoustic waves travel the length $\delta$ of the electrode gap, the velocity $v$ of propagation (Alfvèn speed) of these waves being given by the expression $$v = \sqrt{v_0^2 + u^2} \qquad (18)$$

Thus, the breakdown of a plasma column may be traceable to standing magnetoacoustic waves developing in the interelectrode gap.

If the discharge time of condenser 19 ranges between 0.1 and 1 millisecond, the plasma column will thus break down several times during each discharge.

For small values of $p$ we may assume that the plasma density $\rho$ increases approximately linearly with the magnetic pressure $p_H$. Thus, from Equation 17, $$\tau_{max} \propto r^{1/2} \qquad (19)$$

With large ambient pressures ($p \gg p_0$), $\rho$ varies proportionally with p so that, from Equations 4, 5 and 17, $$\tau_{max} \propto (pr^3)^{1/2} \qquad (20)$$

Since, according to Equation 10, r is proportional to $p^{-1/2}$, Equation 20 can be rewritten in the form $$\tau_{max} \propto p^{1/4} \qquad (21)$$

Thus, the number of discharges per unit of time increases with pressure.

The quantity of matter transported during a single discharge is $$d = r^2 \cdot \pi \delta \rho_0 \qquad (22)$$

whence $$d \propto \rho_0 p^{-1} \qquad (23)$$

Introducing now the aforestated relationship $$\rho_0 \propto p \qquad (24)$$

which applies to large values of $p$, I find that the quantity $d$ is substantially independent of $p$ so that the overall amount D of matter removed in unit time is given by $$D = d \tau_{max} \propto p^{1/4} \qquad (25)$$

This shows that, for high ambient pressures, the flow of eroded material is proportional to the fourth root of the pressure.

I claim:

1. A process for machining metallic workpieces, comprising the steps of immersing a workpiece in an at least semidielectric liquid, placing an electrode in proximity with a surface of the workpiece to be machined, connecting said electrode and said workpiece across a spark generator to initiate repetitive discharges across the gap between said electrode and said surface, and maintaining said liquid during said discharges under a static pressure of at least several atmospheres exceeding the magnetic pressure prevailing in said gap at the time of discharge.

2. A process as defined in claim 1 wherein said static pressure is generated by admitting a pressurized gas into a working chamber in which the workpiece and said electrode are situated.

3. A device for machining workpieces by electro-erosion, comprising a chamber; a support for a metallic workpiece in said chamber; an electrode disposed in said chamber in proximity to a surface of a workpiece to be machined; an at least semidielectric liquid enveloping said support and said electrode in said chamber; a spark generator connected across said support and said electrode for creating a discharge within said liquid between said electrode and said surface; and pressurizing means in said chamber for maintaining said liquid under a static pressure of at least several atmospheres during said discharge.

4. A device as defined in claim 3 wherein said pressurizing means comprises a gas cushion overlying said liquid.

5. A device as defined in claim 4 wherein said chamber is provided with a tightly fitting lid for sealing said gas cushion therein, said support being suspended from said lid.

6. A device as defined in claim 5 wherein said lid is provided with an insulating insert, said electrode being provided with a rod-shaped supply conductor traversing said insert.

References Cited

UNITED STATES PATENTS 3,109,120  10/1963  Scarpelli.

FOREIGN PATENTS 1,139,359  11/1962  Germany.

RALPH F. STAUBLY, Primary Examiner